United States Patent
Gattiker et al.

(10) Patent No.: US 9,971,828 B2
(45) Date of Patent: *May 15, 2018

(54) DOCUMENT TAGGING AND RETRIEVAL USING PER-SUBJECT DICTIONARIES INCLUDING SUBJECT-DETERMINING-POWER SCORES FOR ENTRIES

(71) Applicant: INTERNATIONAL BUSINESS MACHINES CORPORATION, Armonk, NY (US)

(72) Inventors: Anne Elizabeth Gattiker, Austin, TX (US); Fadi H. Gebara, Austin, TX (US); Anthony N. Hylick, Austin, TX (US); Rouwaida N. Kanj, Round Rock, TX (US); Jian Li, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 14/887,495

(22) Filed: Oct. 20, 2015

(65) Prior Publication Data
US 2016/0041975 A1    Feb. 11, 2016

Related U.S. Application Data

(63) Continuation of application No. 13/891,610, filed on May 10, 2013, now Pat. No. 9,262,510.

(51) Int. Cl.
*G06F 17/30* (2006.01)
*G06F 17/27* (2006.01)

(52) U.S. Cl.
CPC .... *G06F 17/30616* (2013.01); *G06F 17/2735* (2013.01); *G06F 17/30011* (2013.01); *G06F 17/30424* (2013.01)

(58) Field of Classification Search
CPC ......... G06F 17/30011; G06F 17/30424; G06F 17/2735; G06F 17/30616
See application file for complete search history.

(56) References Cited

U.S. PATENT DOCUMENTS 5,404,514 A * 4/1995 Kageneck ........... G06F 17/3061
5,715,468 A * 2/1998 Budzinski ............... G06F 17/27
704/9

(Continued)

FOREIGN PATENT DOCUMENTS

| KR | 2010106718 A | 10/2010 |
|---|---|---|
| WO | WO 2007008263 | 1/2007 |
| WO | WO 2012040673 | 3/2012 |

OTHER PUBLICATIONS

U.S. Appl. No. 14/881,453, filed Oct. 13, 2015, Gattiker, et al.

(Continued)

*Primary Examiner* — Shiow-Jy Fan
(74) *Attorney, Agent, or Firm* — Mitch Harris, Atty at Law, LLC; Andew H. Harris; Mercedes L. Hobson

(57) ABSTRACT

Techniques for managing big data include tagging of documents and subsequent retrieval using per-subject dictionaries having entries with subject-determining-power scores. The subject-determining-power scores provide an indication of the descriptive power of the term with respect to the subject of the dictionary containing the term. The same term may have entries in multiple dictionaries with different subject-determining-power scores in each of the dictionaries. A retrieval request for one or more documents containing search terms descriptive of the one or more documents can be processed identifying a set of candidate documents tagged with subjects and optional terms, and then applying subject-determining-power scores from the multiple dictionaries for the search term to determine a subject for the search (Continued)

term. The method then selects the one or more documents from the candidate documents according to the subject.

17 Claims, 6 Drawing Sheets

(56) References Cited

U.S. PATENT DOCUMENTS

| | | | | |
|---|---|---|---|---|
| 6,038,561 | A | * | 3/2000 | Snyder .............. G06F 17/30011 |
| 6,098,066 | A | * | 8/2000 | Snow ................ G06F 17/30011 |
| 6,377,949 | B1 | * | 4/2002 | Gilmour ........... G06F 17/30616 |
| 6,473,730 | B1 | | 10/2002 | McKeown et al. |
| 6,510,434 | B1 | | 1/2003 | Anderson et al. |
| 6,519,581 | B1 | | 2/2003 | Hofmann et al. |
| 6,546,002 | B1 | | 4/2003 | Kim |
| 7,028,250 | B2 | | 4/2006 | Ukraincyzk et al. |
| 7,069,505 | B2 | | 6/2006 | Tamano |
| 7,185,001 | B1 | | 2/2007 | Burdick et al. |
| 7,401,087 | B2 | | 7/2008 | Copperman et al. |
| 7,676,462 | B2 | | 3/2010 | Kirkland et al. |
| 8,019,748 | B1 | | 9/2011 | Wu et al. |
| 8,180,783 | B1 | | 5/2012 | Fletcher et al. |
| 2003/0061200 | A1 | * | 3/2003 | Hubert .............. G06F 17/30011 |
| 2003/0061201 | A1 | * | 3/2003 | Grefenstette ..... G06F 17/30011 |
| 2003/0158839 | A1 | | 8/2003 | Faybishenko et al. |
| 2004/0024739 | A1 | * | 2/2004 | Copperman ...... G06F 17/30616 |
| 2005/0022114 | A1 | * | 1/2005 | Shanahan ................ G06F 21/10 |
| | | | | 715/234 |
| 2005/0256889 | A1 | * | 11/2005 | McConnell ....... G06F 17/30286 |
| 2005/0289168 | A1 | | 12/2005 | Green et al. |
| 2006/0101102 | A1 | | 5/2006 | Su et al. |
| 2006/0235843 | A1 | | 10/2006 | Musgrove et al. |
| 2008/0082486 | A1 | | 4/2008 | Lermant et al. |
| 2008/0140684 | A1 | * | 6/2008 | O'Reilly ........... G06F 17/30707 |
| 2009/0006391 | A1 | | 1/2009 | Ram |
| 2009/0094020 | A1 | | 4/2009 | Marvit et al. |
| 2009/0198669 | A1 | | 8/2009 | Shaw et al. |
| 2009/0222395 | A1 | * | 9/2009 | Light .................... G06F 17/278 |
| | | | | 706/47 |
| 2009/0292686 | A1 | | 11/2009 | Carter et al. |
| 2010/0131507 | A1 | | 5/2010 | Pradhan et al. |
| 2010/0169375 | A1 | | 7/2010 | Cumby et al. |
| 2010/0198816 | A1 | | 8/2010 | Kwan |
| 2010/0293174 | A1 | | 11/2010 | Bennett et al. |
| 2011/0125791 | A1 | | 5/2011 | Konig et al. |
| 2011/0184932 | A1 | | 7/2011 | Hennum et al. |
| 2011/0208776 | A1 | | 8/2011 | Lee et al. |
| 2011/0320186 | A1 | | 12/2011 | Butters et al. |
| 2011/0320437 | A1 | | 12/2011 | Kim et al. |
| 2012/0078902 | A1 | | 3/2012 | Duboue et al. |
| 2012/0158703 | A1 | | 6/2012 | Li et al. |
| 2013/0173604 | A1 | | 7/2013 | Li et al. |
| 2014/0337357 | A1 | | 11/2014 | Gattiker et al. |
| 2015/0106376 | A1 | | 4/2015 | Gattiker et al. |
| 2015/0134666 | A1 | | 5/2015 | Gattiker et al. |
| 2016/0299967 | A1 | | 10/2016 | Gattiker et al. |

OTHER PUBLICATIONS

U.S. Appl. No. 14/854,767, filed Sep. 15, 2015, Gattiker, et al.

Godoy, et al., "Modeling User Interests by Conceptual Clustering," ISISTAN Research Insititute, UNICEN University Campus Universitario, Tandil (7000),Jan. 18, 2005, pp. 247-265, Buenos Aires, Argentina.

Software Patent Institute, et al., "A Framework for Basic Research on Mechanized Information Storage, Search and Selection," IP.com No. IPCOM000128819D, Sep. 19, 2005, 19 pages (pp. 1-19 in pdf).

IBM, "System and Method to Refine Search Terms for Repetitive Search Queries Based on Explicit User Feedback," IP.com No. IPCOM000160889D, Dec. 3, 2007, 3 pages (pp. 1-3 in pdf).

Anonymous, "Parse Search Terms in Content Discovery," IP.com No. IPCOM000203097D, Jan. 19, 2011, 4 pages (pp. 1-4 in pdf).

IBM, "Enhancing the Classification, Organization, and Mining of Unstructured Data Using Second and Higher Order Meta-Tags," IP.com No. IPCOM000143547D, Nov. 28, 2006, 4 pages (pp. 1-4 in pdf).

Anonymous, "Complex Data Tags," IP.com No. IPCOM000214383D, Jan. 24, 2012, 5 pages (pp. 1-5 in pdf).

Gurumurthy, et al., "Method and System for Sharing Search Queries and Search Results," IP.com No. IPCOM000210142D, Aug. 26, 2011, 3 pages (pp. 1-3 in pdf).

Manning, et al., "An Introduction to Information Retrieval," Apr. 2009, pp. 349-375 (pp. 1-27 in pdf), Cambridge University Press, downloaded from: http://nlp.stanford.edu/IR-book/html/htmledition/flat-clustering-1.html on Sep. 3, 2013.

Manning, et al., "An Introduction to Information Retrieval," Apr. 2009, pp. 253-287 (pp. 1-35 in pdf), Cambridge University Press, downloaded from: http://nlp.stanford.edu/IR-book/html/htmledition/text-classification-and-naive-bayes-1.html on Sep. 3, 2013.

Castillo, et al., "Automatic Assignment of Domain Labels to WordNet", Proceedings of the 2nd International WordNet Conference, Jan. 2004, pp. 75-82, Brno, Czech Republic.

Kamat, et al., "Understanding Users Intent by Deducing Domain Knowledge Hidden in Web Search Query Keywords", International Journal of Computer Applications, Apr. 2013, pp. 17-20, vol. 67, No. 15 , IJCA Journal.

Office Action in U.S. Appl. No. 13/891,610 dated Jun. 4, 2015, 22 pages (pp. 1-22 in pdf).

Notice of Allowance in U.S. Appl. No. 13/891,610 dated Oct. 13, 2015, 25 pages (pp. 1-25 in pdf).

* cited by examiner

| 24A | FARM SUPPLIES | |
|---|---|---|
| FEED | | 6 |
| FERTILIZER | | 9 |
| IRRIGATION | | 7 |
| PENS | | 2 |

| 28A DOCUMENT TITLE/ SUMMARY |
|---|
| LINK TO DOCUMENT |
| Subject 1, term 1, term 2, … |
| Subject 2, term 1, term 2, … |

| 24B | OFFICE SUPPLIES | |
|---|---|---|
| PENS | | 8 |
| STAPLES | | 6 |
| PAPER | | 5 |
| FOLDERS | | 7 |

| 28B DOCUMENT TITLE/ SUMMARY |
|---|
| LINK TO DOCUMENT |
| Subject1 |
| Subject 2 |
| … |

Fig. 3

DOCUMENT TAGGING AND RETRIEVAL USING PER-SUBJECT DICTIONARIES INCLUDING SUBJECT-DETERMINING-POWER SCORES FOR ENTRIES

The present application is a Continuation of U.S. patent application Ser. No. 13/891,610, filed on May 10, 2013, and published as U.S. Patent Publication No. 20140337357 on Nov. 13, 2014, and claims priority thereto under 35 U.S.C. § 120. The disclosure of the above-referenced parent U.S. patent application is incorporated herein by reference.

BACKGROUND OF THE INVENTION

1. Field of the Invention

The present invention is related to document retrieval and categorization, as well as information searches, and more specifically to a computer-performed method, computer system and computer program product for document tagging and retrieval using per-subject dictionaries that include subject-determining-power scores for entries.

2. Description of Related Art

Information storage and retrieval in computer systems is an ever-evolving technology as collections of data become progressively larger and more complex. So-called "big data" involves collection of large amounts of data that may be essentially unfiltered and uncategorized. While businesses, government and other entities would like to capitalize on information that can be gleaned from such large collections of data, techniques to efficiently retrieve a manageable amount of information in response to a query are needed.

Retrieval of information from present-day databases and other more loosely-coupled information sources such as the Internet is typically performed by either crawler-based indexing, in which software engines obtain indexing information from stored documents, or from human-built directories that categorize the stored documents. However, once the data source becomes sufficiently large, the size of the response to a query also grows.

Therefore, it would be desirable to provide a method, computer system and computer program that can more efficiently handle categorization of documents and retrieval of documents in response to queries.

BRIEF SUMMARY OF THE INVENTION

The invention is embodied in a computer-performed method, computer program product and computer system that can efficiently categorize and retrieve documents. The method is a method of operation of the computer system, which executes the computer program product to carry out the steps of the method.

The method stores entries in multiple dictionaries that are each associated with a different subject. The entries contain descriptive terms and corresponding subject-determining-power scores. The subject-determining-power scores indicate the relative strength or weakness of the descriptive terms with respect to the subject associated with the containing dictionary. The method then accesses the collection of documents by associating descriptive terms contained in the collection of documents with the subject of the dictionary containing the particular term.

A retrieval method may further receive a request for one or more documents, the request containing at least one search term descriptive of the one or more documents. The method identifies candidate documents using the subject dictionaries that have entries matching the search terms. The candidate documents are selected using tags associated with the document matching the subject dictionaries found with the search terms.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 3 is a pictorial diagram showing organization of dictionaries as may be used in the document tagging and retrieval system of FIG. 2.

DETAILED DESCRIPTION OF THE INVENTION

Figure 1:
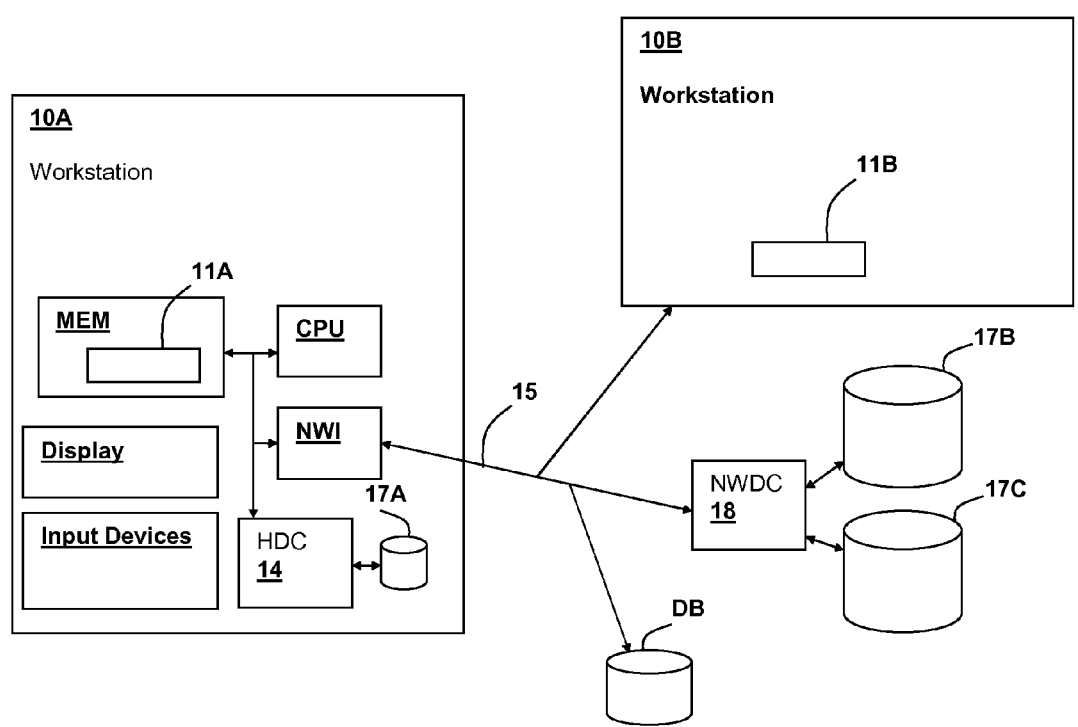
FIG. 1 is a block diagram illustrating a networked computer system in which techniques according to an embodiment of the present invention are practiced.

The present invention relates to document tagging and retrieval, and in particular to techniques for identifying and retrieving files in big data collections. Multiple dictionaries, each having a corresponding subject, contain terms that are associated with the subject, i.e., the terms that ordinarily occur in association with the subject in written documents. Thus, a term may occur across multiple dictionaries, but have a different meaning or descriptive power with respect to different subjects. The term entries in each dictionary have a score value associated with the term and stored in the dictionary along with the term. The score value is a "subject-determining-power score" (SDP score) that is an indicator of the power of the term to determine the subject of a query, a document, or other item associated with the term. For example, an SDP score may be used to weight terms used to tag a document, according to how strongly they indicate that the document concerns a particular subject. A tag is stored information that is descriptive in some manner of an associated document. The tag can be stored in the document itself, e.g., as metadata in a header, or the tag may be stored separately from the document, e.g., in a database containing a link to the document. The process of tagging is generating or selecting the tag information and storing it in a manner that associates the tag(s) with the document. Tagging can occur when a document is first added to a collection, which may be storage of the document in a particular storage location, or may be insertion of a link to the document in a database, or tagging may occur subsequently.

Documents are retrieved by identifying documents from a collection and returning the documents to a requesting entity. The particular documents returned and the particular order of the documents can be determined by the quality of a match of the documents to one or more subjects determined from the contents of a query. The response to a query can differ. One possible response includes copying the documents to a predetermined location, such as a directory that has been specified or created to receive the results of the query. Another possible response is generation of a file that contains a list of document identifiers, e.g., file pathnames or links, in order of priority, and optionally including a match-score associated with each document. A third option is generation of an html document, e.g., html browser page that provides links to the documents in the order of priority, e.g. ordered by quality of the match of the individual documents to the query.

As mentioned above, dictionaries, as referred to herein, are subject-specific lists of terms along with differentiating SDP scores for the terms. A term can be a single word or multiple words, and can potentially include letters, numbers, punctuation, etc. The same term may appear in the dictionaries for different subjects with different SDP scores. In essence, an SDP score for a particular term for a particular subject indicates how strongly the appearance of the term suggests the term concerns the particular subject. Terms can be single words or multi-words, e.g., War of 1812. When processing queries or documents to discover terms, standard text pre-processing can be performed before any of the analytical steps, such as phrase detection using punctuation or detection of separators such as the, and, more, etc., which can be removed from the text. Similarly, stemming can be performed to reduce or expand words of a single root to a single term, e.g., the word "acted" may be stemmed to the word "act."

Referring to FIG. 1, a networked computer system in which an embodiment of the present invention is practiced is depicted in a block diagram. A first workstation computer system 10A includes a processor CPU coupled to a memory MEM that contains program instructions for execution by processor CPU, including a document collection interface 11A, which may be a dedicated engine for performing tasks in a collection of documents as described herein, or which may be a generic browser interacting with a dedicated engine located in another system, such as document collection interface 11B of workstation 10B. The tasks performed by one or both of document collection interfaces 11A and 11B include query processing, document tagging, directory creation and other tasks associated with managing the collection of documents and dictionaries used by and operated on by the embodiments of the invention disclosed herein. Workstation computer 10A is also depicted as including a graphical display Display and input devices Input Devices, such as mice and keyboards, for interacting with user interfaces including login screens and other user interfaces for interacting with other computers connected to the network, for example, administration screens for administering identification and authorization profiles used by the techniques of the present invention.

Workstation computer system 10A also includes a hard disc controller HDC 14 that interfaces processor CPU to local storage device 17A and a network interface NWI that couples workstation computer system 10A to network 15, which may be fully wireless, fully wired or any type of hybrid network. Network interface NWI provides access to network resources, such as remote storage provided by networked storage devices 17B and 17C, which are coupled to network 15 by network disc controller (NWDC) 18. An external database DB may provide storage for documents, dictionaries, query results and other information discussed herein, alternatively document collection interfaces 11A and 11B may perform database organization, with the above-listed items stored as files in local storage device 17A or networked storage devices 17B and 17C. Workstation computer system 10B has an internal organization similar to that depicted in workstation computer system 10A and is also coupled to network 15.

Network 15 may include wireless local area networks (WLANs), wired local-area networks (LANs), wide-area networks (WANs) or any other suitable interconnection that provides communication between workstation computer systems 10A and 10B, storage devices 17A-17C, external database DB and any other systems and devices coupled to network 15. The present invention concerns document storage and retrieval functionality that is not limited to a specific computer system or network configuration. Finally, the specification workstation computer systems 10A and 10B and the location of their specific memory MEM and document collection interfaces 11A and 11B does not imply a specific client-server relationship or hierarchical organization, as the techniques of the present invention may be employed in distributed systems in which no particular machine is identified as a server. However, at least one of the machines provides an instance and functionality of an object or interface that performs document storage and retrieval in accordance with an embodiment of the present invention. The objects or interfaces implementing document collection interfaces 11A and 11B process information according to methods and structures of the present invention, as described in further detail below.

Figure 2:
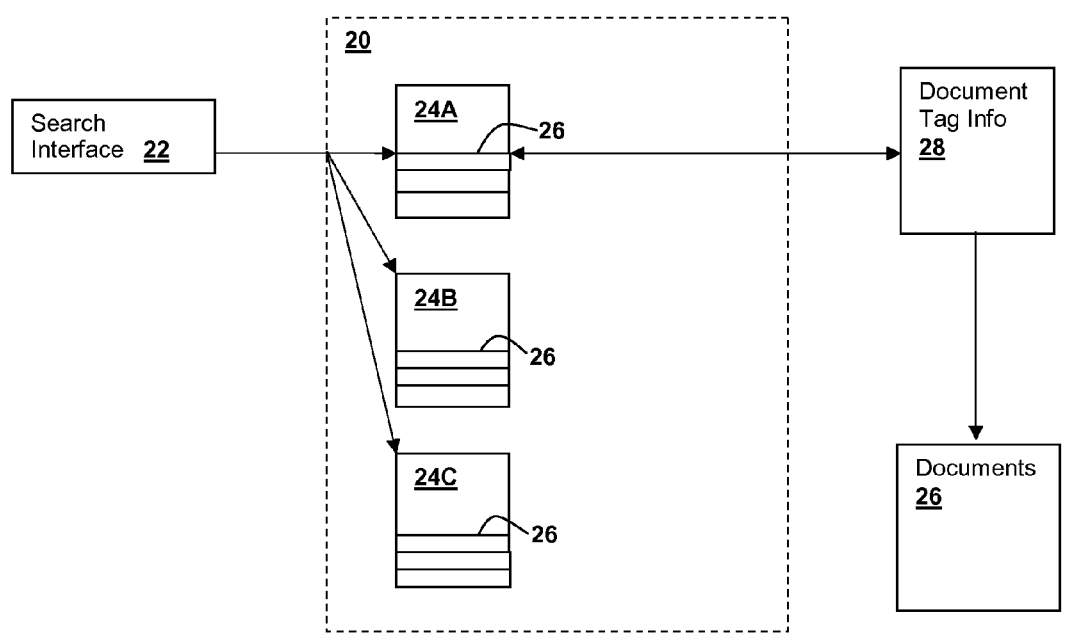
FIG. 2 is an organizational diagram showing an organization of a document tagging and retrieval system in accordance with an embodiment of the present invention.

Referring now to FIG. 2, an organization of a document tagging and retrieval system in accordance with an embodiment of the present invention is illustrated. A search interface 22, which may be a dedicated search interface, or a browser-based search portal as described above, provides access to a dictionary manager 20 that processes the terms in the queries supplied by search interface 22 in order to determine the subject of the query and other targeted information that will be used to retrieve one or more of documents 26. Per-subject dictionaries 24A-24C contain lists of terms and their corresponding SDP scores for the containing dictionary. Document tag information 28, which may be stored in documents 26, but is generally stored in a separate database or file for faster parsing of document tag information 28, is also accessed by dictionary manager 20 to discover documents having the closest match to the subject and particular search terms provided in a query from search interface 22. Dictionaries including SDPs can be created in different ways including: human-generated lists of terms with human-estimated SDPs, human-generated lists of terms with automatically calculated SDPs.

Referring now to FIG. 3, organization of dictionaries as may be used in the document tagging and retrieval system of FIG. 2, is shown. A first example dictionary 24A has a corresponding subject of Farm Supplies, and contains the terms FEED, FERTILIZER, IRRIGATION and PENS, with associated SDP scores given in an exemplary range of 1 through 10, of 6, 9, 7 and 2, respectively. Thus, discovery of the term FERTILIZER in the query indicates a high probability that the subject of the search corresponds to Farm Supplies, but the discovery of the term PENS in the query indicates only a low probability that the subject of the search corresponds to Farm Supplies. Another example dictionary 24B, having a corresponding subject of Office Supplies, contains the terms PENS, STAPLES, PAPER and FOLDERS, with associated SDP scores of 8, 6, 5, and 7, respectively. The pair of dictionaries 24A and 24B illustrates that a term, e.g., PENS, may be present in multiple dictionaries and have different SDP scores in each of the different per-subject dictionaries, in the exemplary case, illustrating that the term PEN is a much stronger indication that a search concerns Office Supplies than Farm Supplies.

Also illustrated in FIG. 3, are exemplary document tags that may be used to implement document tag information 28 as illustrated in FIG. 2. In exemplary document tag 28A, the tag information, which is just a single document tag that may be included in a header of a document, stored in a tag database, or otherwise organized in a tag store file, contains an optional document title and summary, a link to the actual document, and lists of terms by subject for each of multiple subjects that the document concerns. The title and summary information are optional, but may be included to provide a quick resource for displaying search results. The link to the document is not needed if the tag information is itself stored in the document header. Exemplary document tag 28B includes only subject names without terms, as dictionary manager 20 can use lists of subjects without specified lists of terms to perform matching within the set of dictionaries.

Figure 4:
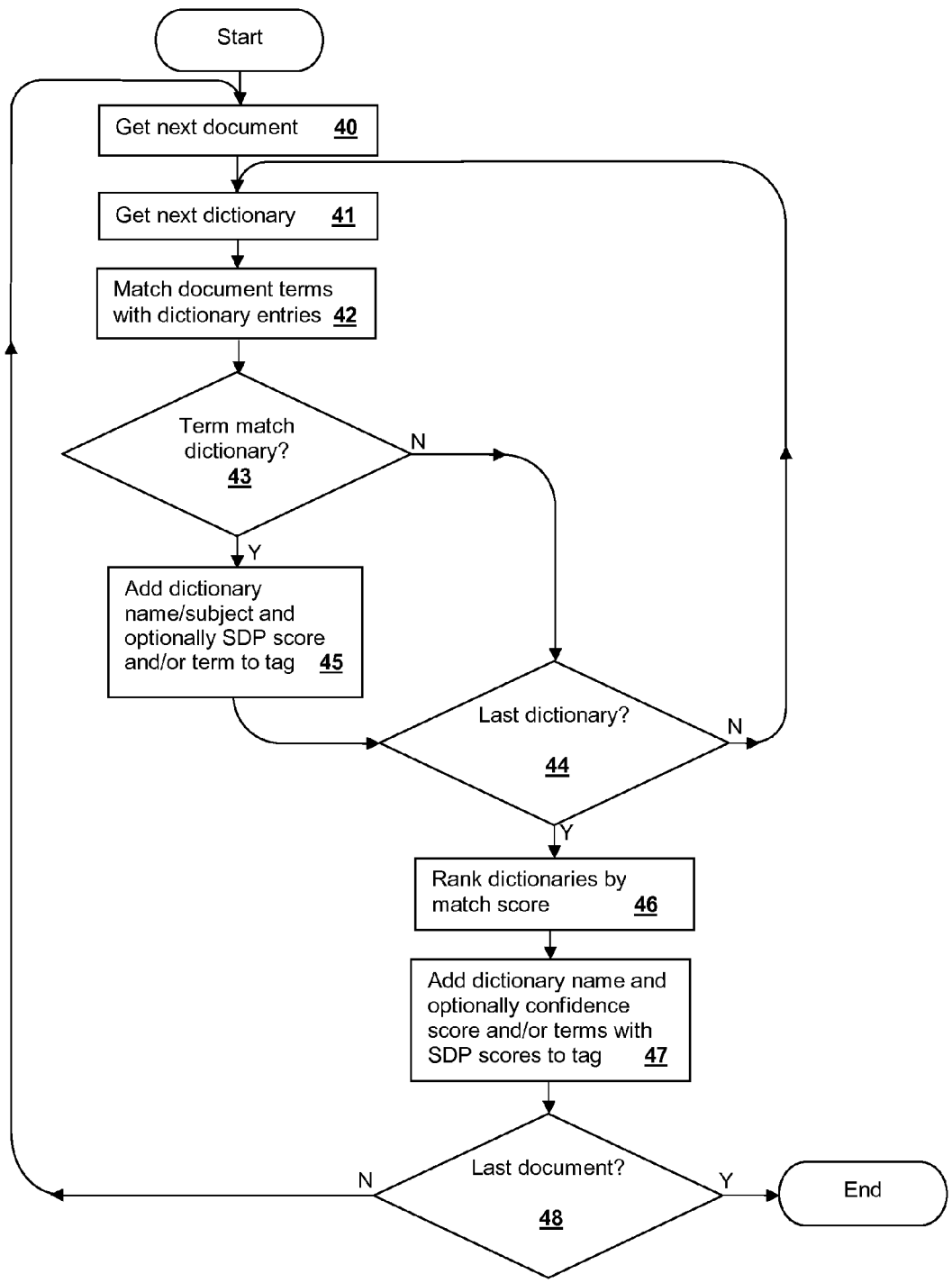
FIG. 4 is a flowchart illustrating a document tagging methodology in accordance with an embodiment of the present invention.

Referring now to FIG. 4, a method of tagging documents in accordance with an embodiment of the invention is shown in a flowchart. The next document is retrieved (step 40) and the next dictionary is accessed (step 41). The document terms are matched with the dictionary entries (step 42). If a term matches a term in one of the dictionaries (decision 43), then the dictionary name or subject (or other suitable identifier for the dictionary), and optionally the SDP score and term is added to the tag information for the document (step 45). Until the last dictionary is processed (decision 44) the next dictionary is accessed (step 41). After the last dictionary is processed (decision 44), the dictionaries are ranked by match score (step 46), and the dictionary name and optionally confidence score and/or terms with SDP scores are added to the document tag (step 47). Until the last document is processed (decision 48), the next document is retrieved and processed by the process of steps 40-48. In the example, the first step in tagging a document is matching the document against the set of dictionaries. The document can then be tagged with information such as: the names of the n top-matching dictionaries, a match score of the document against all dictionaries, or the top m words from the n top-matching dictionaries. A dictionary match annotation in the tag may include a confidence score. If dictionary words are included in the tags, they can include the SDP of the word in the dictionary. The choice of information with which to tag depends on storage space and ease of use for retrieval of the document. Dictionary-matching may be performed by finding all terms that exist in both the document and a dictionary of interest, generating a document-occurrence vector with one entry per common term, generating a dictionary-vector with one entry per common term in the same order as the vector above, and multiplying the two vectors to get a dictionary-match score between the document and the dictionary. The vector multiplication sums the term-by-term products of the two vectors to produce a single number. The values of the dictionary-vector are the SDP scores. For a given document, the process can be repeated for all dictionaries. Once the dictionary-match step is completed, tags can be chosen for the document as described above.

One manner in which the tagging information associated with a single document may be organized is to include the search terms in the tagging information along with the subject and SDP scores, such as illustrated in Table 1 below:

TABLE 1

| Confidence value | Subject of Dictionary | Term/SDP score pairs |
| --- | --- | --- |
| 0.5 | Bicycle | Bottom-Bracket 8, Schwinn 10, Raleigh 10, Frame 3 . . . |
| 0.3 | Home Construction | Brick 5, Frame 3.5, . . . |
| 0.1 | Fishing | Hook 7, Line 2 |

In the Example given above, once a candidate subject has selected, the terms having the top SDP scores (e.g., top 100 terms) may be inserted into the document tagging information in order to generalize the intersection between potential query terms and the document tag information. So, for example, in the above illustration, if the search terms Schwinn and Frame are included in a query, then the values for Schwinn and Frame for the subject Bicycle can be weighted by the confidence value to yield a measure of match for the document, i.e., 0.5×(10+3)=6.5. For example, if three documents having the following entries are matched to the above-query, as illustrated in Table 2 below, then the following match calculations can result.

TABLE 2

| Document | Confidence value | Subject of Dictionary | Term/SDP score pairs |
| --- | --- | --- | --- |
| Doc 1 | 0.5 | Bicycle | Bottom-Bracket 8, Schwinn 10, Raleigh 10, Frame 3 . . . |
| Doc 2 | 0.9 | Yoga | Hatha 10 |
| Doc 3 | 0.7 | Home Construction | Brick 5, Frame 3.5, . . . |

Doc 1: 0.5×(10+3)=6.5
Doc 2: 0
Doc 3 0.7*3.5=2.1

So the search result should return the ordered list <doc 1, doc 3>.

In another form of tag information, a match step has previously been carried out between the documents that are candidates for retrieval and the dictionaries as described above, and the match scores are stored in the tags. Example strategies for carrying out retrieval using such documents are described below.

Strategy 1: $1^{st}$ place search-text match

First, a vector multiplication as described above is performed and a top-matching dictionary t is identified using the text of the query, which in this strategy is used instead of the text of the document. The method then returns all candidate documents having a top-matching dictionary t and then proceeds to documents having a next-to-top matching dictionary t, and so forth until the documents have been exhausted or a threshold number of documents has been found. The documents can optionally be returned in order of a strength of match between the document and t.

Strategy 2: nth place search-text match

First, the vector multiplication as described above is performed and a top-matching dictionary t1, second top-matching dictionary t2, third top-matching dictionary t3, and so forth, are identified using the text of the query. The method then returns all candidate documents having a top-matching dictionary t1 and then proceeds to documents having a top matching dictionary t2, and so forth until the documents have been exhausted or a threshold number of documents has been found. The documents can optionally be returned in order of a strength of match between the document and the various dictionaries.

Each of the dictionary-assisted retrieval techniques described above provides search expansion. Search text is matched to dictionaries, which will generally contain more terms than the search text itself. Since retrieval is done using dictionaries, terms in the dictionaries outside the search text can play a role in identifying relevant documents. For example, "fetlock" is a high subject-determining-power word for the subject "horses". If a search text contains words like "saddle," "ride," and "horse," it may match well to the horse dictionary, which in turn will match to candidate documents that have the word "fetlock" in them. Such candidate documents may not have any of the words "saddle", "ride" or "horse" in them, but could have been identified as being on the subject "horses" by virtue of their using the high-SDP term "fetlock." The query text can be a list of words, as would be used in a typical Internet search engine query, or the query itself can be a document, (e.g., a patent abstract). Note that a document query input may have repeated terms. When repeated terms are present in a query, one option is to use only the unique terms as the query text. Another option is to use the query text as-is, which will cause actions based on term-occurrence to be repeated for repeated terms, which increases the weight accorded to repeated terms.

Figure 5:
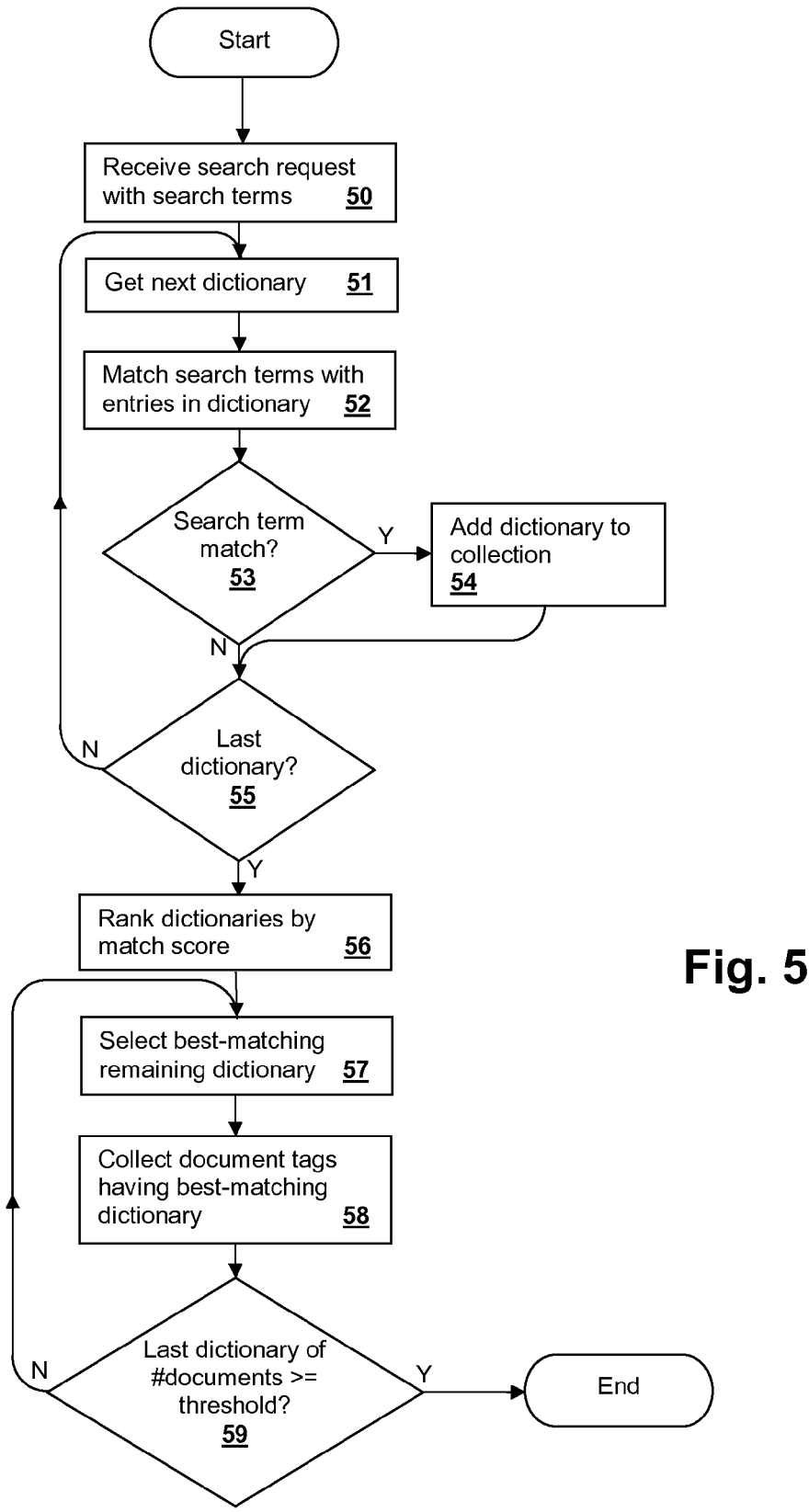
FIG. 5 is a flowchart illustrating a document retrieval methodology in accordance with an embodiment of the present invention.

Referring now to FIG. 5, a method of document retrieval in accordance with an embodiment of the invention is shown in a flowchart. A search request is received with search terms consisting of one or more words (step 50), and the next dictionary is accessed (step 51). Terms, i.e., words or phrases in the search query, are matched with entries in the dictionary (step 52). If the search term matches entries in the dictionary (decision 53), then the dictionary is added to the collection (step 54). Until the last dictionary is reached (decision 55), steps 51-55 are repeated. After the last dictionary is reached (decision 55), the dictionaries are ranked by their match scores (step 56). As described above, the documents can be collected according to their ranked match to a single subject, or a top-ranked number of subjects can be determined from the search term and documents matching those top-ranked subjects can be retrieved. Document tags are collected according to those having the best-matching dictionary (step 58). Until the number of documents is greater than a threshold number (decision 59), the next best-matching dictionary is found (step 57), and steps 57-59 are repeated. The manner in which retrieval is performed depends on the type of document tags that are provided. If tags include dictionary terms in them, the retrieval process can commence with searching directly for the search text among the tags in addition to the subject matches and returning documents having tags that match the query text. If the tags include only dictionary subject matching information, the documents tagged with subject matching dictionaries can be returned.

Graduated Retrieval

One advantage of having SDPs associated with terms is the possibility of performing graduated retrieval. Query terms can be ranked according to their SDPs found in dictionaries. Because the terms may have different SDPs in different dictionaries, a function, such as a maximum or sum, may be taken. Retrieval can then be carried out incrementally using only the highest-ranked search term first. A subset of the document collection which scores high enough against the search term can be identified, and remaining retrieval operations operate on that reduced collection. The next highest-ranked search term can be used next in-turn.

Figure 6:
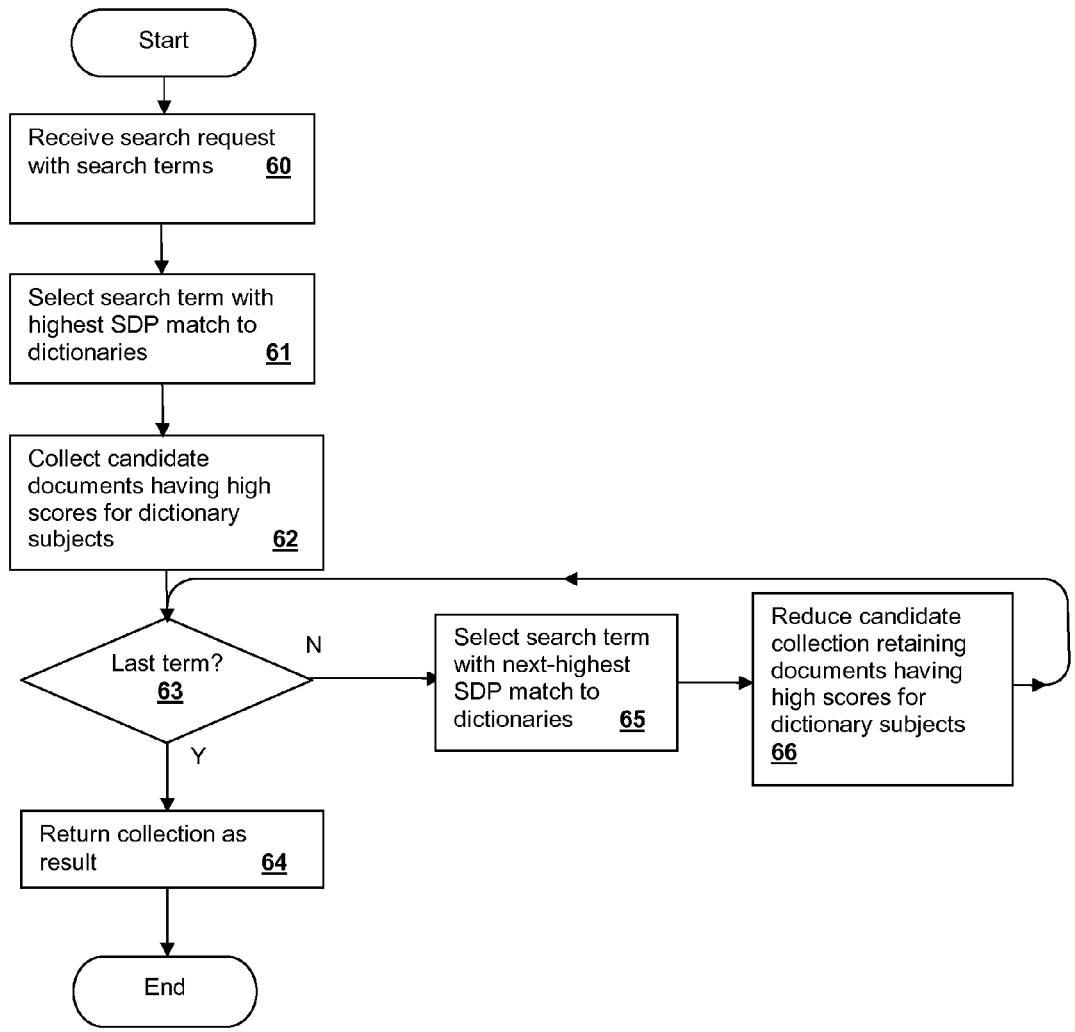
FIG. 6 is a flowchart illustrating a document retrieval methodology in accordance with another embodiment of the present invention.

Referring now to FIG. 6, a method of graduated document retrieval in accordance with an embodiment of the invention is shown in a flowchart. A search request is received with a search term consisting of one or more words (step 60). The search term having the highest SDP match to the dictionaries is selected (step 61) and candidate documents are collected that have high scores for the dictionary subjects (step 62). Until the last term has been processed (decision 63), the term with the next-highest SDP match to the dictionaries is selected (step 65) and the candidate collection is reduced by retaining documents having the highest scores for the current dictionary subjects (step 66). Once the last term has been processed (decision 63), the collection of documents is returned as a result (step 64).

Context

In the methodologies disclosed above, SDP-modifiers can be applied, of which context is an example. Context is information external to the document tags, dictionaries and queries described above that can be used to provide additional insight into semantic content of a query or document. Dictionary-based document classification relies on included terms to indicate an associated subject. At times, the terms may have different meanings or importance depending on the user or segment of the enterprise generating a query or tagging a document. For example, a music dictionary for 9-12 year old girls blogging between 3 pm and 9 pm would be different from one for 30-year-old men blogging after midnight. This invention uses context to improve dictionary-based tagging and retrieval. Specifically, dictionaries are modified to provide context-specific term-associated attributes, especially SDPs. Context identification is used during tagging to choose appropriate dictionary mutations. Dictionary-based document tags are modified to include context-specific information. Context identification is used during retrieval to choose the appropriate tags and dictionary-mutations to apply in the matching process and can also be used during dictionary creation to determine context-specific term-associated attributes, such as SDPs. In general, the addition of context can be thought of as augmenting dictionaries with context information, or as choosing which version of a dictionary to use based on context. An example of dictionaries augmented by context information is given below for the word "foundation" in Tables 4-6 below. The SDPs for "foundation" vary within each of three dictionaries depending on the context of the user.

TABLE 4

Cosmetics Dictionary

|  | Women 5 pm-11 pm | Working Class Men | Big Spender Men |
| --- | --- | --- | --- |
| Foundation | 8 | 0.05 | 0.1 |
| Blush | 8 | 1 | 1 |

TABLE 5

Construction Dictionary

|  | Women 5 pm-11 pm | Working Class Men | Big Spender Men |
|---|---|---|---|
| Foundation Structure | 1 ... | 5 ... | 2 ... |

TABLE 6

Charity Dictionary

|  | Women 5 pm-11 pm | Working Class Men | Big Spender Men |
|---|---|---|---|
| Foundation Donation | 3 ... | 0.01 ... | 6 ... |

Context can be information such as user group, a division of an enterprise to which a user belongs, or a broader concept such as a level of hierarchy in an enterprise. For example, a web service that does business with multiple companies will have interactions with multiple users doing business with the multiple companies. Because the mapping between users and companies is one-to-many, the company "middleman" can be the most useful context, rather than the user. For example, a user's shopping at a discount store vs. a luxury item retailer may be a better indicator of the meaning of his interactions than the direct attributes of the user. Context based on the user can be determined, for example, in the following manners:
  Context can use observable user attributes, e.g.
    8:00 am-5:00 pm users (business); 3:00 pm-10:00 pm users (family)
    People who spend >$100
    People on a BMW blog (affluent); people on an AARP blog (elderly)
  Context can use stored information
    E.g., subscription site user interest profiles
  Context can infer user attributes through interaction
    E.g., present users with college football documents related to University A and University B. If the user reads University A, identify the user as a University A fan.
  Context can use enterprise information
    E.g., user is from accounting vs. engineering
    E.g., documents related to different projects may be explicitly coded.
  Context can also be observed according to broader groups, (e.g, company serviced by the webs service described above).

To best utilize context-enhanced dictionaries, it is helpful to use context information for all three operations: tagging, retrieval and dictionary-creation. For tagging, information about the author or source of the document is used to do the dictionary match on which tagging is based. Such information may be gathered in real-time as the document is being authored (e.g., blog or garnered from meta-information stored with the document or time/date stamp). For retrieval, attributes of the person or entity initiating the search may be captured and used to determine context. For manual dictionary creation, personal observation or inferences drawn by the human creating the dictionary can be used to differentiate term attributes according to context. Then, context-specific dictionaries can be created. Cases where a term's context does not affect its SDP may be identified and extracted to be a part of a generic, non-context-specific, subject-specific dictionary. It is noted that users from some contexts may be more important in some queries than others (e.g., >$100 spenders), so the system may bias results according to importance. Also, contexts can change over time and definitions may need to be periodically updated.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer-readable medium(s) may store a program in accordance with an embodiment of the invention. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer-readable storage medium may be any tangible medium that can contain, or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method of organizing a collection of electronic documents, the method comprising:
  in a computer system, storing entries in multiple dictionaries separate from and not associated with any particular one of the electronic documents, wherein the multiple dictionaries are data structures within the computer system, wherein individual ones of the multiple dictionaries correspond to one of a plurality of different subjects, wherein the entries contain a descriptive term and a subject-determining-power score corresponding to the descriptive term, wherein an individual subject-determining-power score indicates the relative strength or weakness of the corresponding descriptive term with respect to the subject of the one of the multiple dictionaries containing an entry in which the descriptive term is stored, and wherein at least some of the descriptive terms are present in two or more of the multiple dictionaries;

responsive to requests within the computer system to identify one or more of the electronic documents, wherein the requests include at least one search term descriptive of the one or more electronic documents, accessing the collection of electronic documents by matching the at least one search term with descriptive terms in the multiple dictionaries to determine one or more subjects of the request from subjects of one or more of the multiple dictionaries that contain the descriptive terms matching the at least one search term, and applying the subject-determining power scores to determine which of the subjects of the one or more of the multiple dictionaries that contain the descriptive terms that match the at least one search term are most applicable to the request;

ranking the one or more subjects determined by the matching according to a match score computed for individual ones of the one or more subjects with respect to the at least one search term;

until a predetermined number of documents are identified, collecting document tags having a best match to the highest-ranking subject for which the document tags have not yet been collected, in a collected set of document tags for the request, wherein the collecting document tags collects the document tags from a tag database separate from the documents and the dictionaries, whereby a speed of matching the documents to the one or more subjects is increased, wherein the document tags include for each of one or more subject entries in the document tags, multiple tag terms with subject-power determining scores corresponding to the tag terms and a confidence score, wherein the collecting document tags further determines the best-match to the highest-ranking subject for which the document tags have not been collected by multiplying all of the tag terms in the entry corresponding to the highest-ranking subject for which the document tags have not been collected by the confidence score of the entry to generate a document subject match score, and compare the computed document subject match scores to determine the best match; and storing a representation of the collected set of document tags that identify the electronic documents in a memory of the computer system to provide the response to the request to identify the one or more electronic documents.

2. The method of claim 1, wherein the collecting further matches the at least one search term with terms contained within the tags, and wherein the collecting further selects electronic documents having associated tags matching the search term.

3. The method of claim 1, wherein the one or more subjects comprises multiple subjects, and wherein the collecting reduces the number of the one or more electronic documents according to values of the subject-determining-power scores for the multiple subjects to refine the response to the request.

4. The method of claim 1, further comprising determining a context for the request, wherein the context is information external to the at least one search term, wherein the tags contain context-dependent information, and wherein the collecting further matches the context with the context-dependent information stored in the tags to obtain the collected set of electronic documents.

5. The method of claim 4, wherein the matching further selects from among multiple context-dependent sets of entries in the one or more of the multiple dictionaries according to a context provided with the request, whereby the applying applies different subject-determining-power scores from the one or more of the multiple dictionaries for the at least one search term according to the context.

6. The method of claim 1, further comprising tagging electronic documents within the collection of electronic documents, the tagging comprising:

finding terms within the electronic documents to be tagged;

matching the terms with the descriptive terms within entries in the multiple dictionaries to determine a ranking of the multiple dictionaries by relative relation of their associated subjects to the content of the electronic documents to be tagged; and storing a result of the matching for subsequent retrieval when performing electronic document searches.

7. A computer system comprising:

a processor for executing program instructions; and a memory for storing the program instructions, wherein the program instructions are program instructions for organizing a collection of electronic documents, and wherein the program instructions comprise program instructions that store entries in multiple dictionaries separate from and not associated with any particular one of the electronic documents, wherein the multiple dictionaries are data structures within the computer system, wherein individual ones of the multiple dictionaries correspond to one of a plurality of different subjects, wherein the entries contain a descriptive term and a subject-determining-power score corresponding to the descriptive term, wherein an individual subject-determining-power score indicates the relative strength or weakness of the corresponding descriptive term with respect to the subject of the one of the multiple dictionaries containing an entry in which the descriptive term is stored, and wherein at least some of the descriptive terms are present in two or more of the multiple dictionaries, program instructions that, responsive to requests to identify one or more of the electronic documents, wherein the requests include at least one search term descriptive of the one or more electronic documents, access the collection of electronic documents by matching the at least one search term with descriptive terms in the multiple dictionaries to determine one or more subjects of the request from subjects of one or more of the multiple dictionaries that contain the descriptive terms matching the at least one search term, and applying the subject-determining power scores to determine which of the subjects of the one or more of the multiple dictionaries that contain the descriptive terms that match the at least one search term are most applicable to the request, program instructions that rank the one or more subjects determined by the matching according to a match score computed for individual ones of the one or more subjects with respect to the at least one search term, program instructions that collect document tags having a best match to the highest-ranking subject for which the document tags have not yet been collected, in a collected set of document tags for the request, wherein the program instructions for collecting document tags collect the document tags from a tag database separate from the documents and the dictionaries, whereby a speed of matching the documents to the one or more subjects is increased, until a predetermined number of documents are identified, wherein the document tags include for each of one or more subject entries in the document tags, multiple tag terms with subject-power determining scores corresponding to the tag terms and a confidence score, wherein the program instructions that collect document tags further determine the best-match to the highest-ranking subject for which the document tags have not been collected by multiplying all of the tag terms in the entry corresponding to the highest-ranking subject for which the document tags have not been collected by the confidence score of the entry to generate a document subject match score, and compare the computed document subject match scores to determine the best match, and program instructions that store a representation of the collected set of document tags that identify the electronic documents in a memory of the computer system to provide the response to the request to identify the one or more electronic documents.

8. The computer system of claim 7, wherein the program instructions that collect further match the at least one search term with terms contained within the tags, and wherein the program instructions that collect further select electronic documents having associated tags matching the search term.

9. The computer system of claim 7, wherein the one or more subjects comprises multiple subjects, and wherein the program instructions that collect reduce the number of the one or more electronic documents according to values of the subject-determining-power scores for the multiple subjects to refine the response to the request.

10. The computer system of claim 7, wherein the program instructions further comprise program instructions that determine a context for the request, wherein the context is information external to the at least one search term, wherein the tags contain context-dependent information, and wherein the program instructions that collect further match the context with the context-dependent information stored in the tags to obtain the collected set of electronic documents.

11. The computer system of claim 10, wherein the program instructions that access further select from among multiple context-dependent sets of entries in the one or more of the multiple dictionaries according to a context provided with the request, whereby the applying applies different subject-determining-power scores from the one or more of the multiple dictionaries for the at least one search term according to the context.

12. The computer system of claim 7, further comprising program instructions that tag electronic documents within the collection of electronic documents, the program instructions for tagging comprising:
  program instructions that find terms within the electronic documents to be tagged;
  program instructions that match the terms with the descriptive terms within entries in the multiple dictionaries to determine a ranking of the multiple dictionaries by relative relation of their associated subjects to the content of the electronic documents to be tagged; and
  program instructions that store a result of the matching for subsequent retrieval when performing electronic document searches.

13. A computer program product comprising a computer-readable storage device storing program instructions for organizing a collection of electronic documents, wherein the program instructions comprise program instructions for:
  in a computer system, storing entries in multiple dictionaries separate from and not associated with any particular one of the electronic documents, wherein the multiple dictionaries are data structures within the computer system, wherein individual ones of the multiple dictionaries correspond to one of a plurality of different subjects, wherein the entries contain a descriptive term and a subject-determining-power score corresponding to the descriptive term, wherein an individual subject-determining-power score indicates the relative strength or weakness of the corresponding descriptive term with respect to the subject of the one of the multiple dictionaries containing an entry in which the descriptive term is stored, and wherein at least some of the descriptive terms are present in two or more of the multiple dictionaries;
  responsive to requests within the computer system to identify one or more of the electronic documents, wherein the requests include at least one search term descriptive of the one or more electronic documents, accessing the collection of electronic documents by matching the at least one search term with descriptive terms in the multiple dictionaries to determine one or more subjects of the request from subjects of one or more of the multiple dictionaries that contain the descriptive terms matching the at least one search term, and applying the subject-determining power scores to determine which of the subjects of the one or more of the multiple dictionaries that contain the descriptive terms that match the at least one search term are most applicable to the request;
  ranking the one or more subjects determined by the matching according to a match score computed for individual ones of the one or more subjects with respect to the at least one search term;
  until a predetermined number of documents are identified, collecting document tags having a best match to the highest-ranking subject for which the document tags have not yet been collected, in a collected set of document tags for the request, wherein the collecting document tags collects the document tags from a tag database separate from the documents and the dictionaries, whereby a speed of matching the documents to the one or more subjects is increased, wherein the document tags include for each of one or more subject entries in the document tags, multiple tag terms with subject-power determining scores corresponding to the tag terms and a confidence score, wherein the program instructions for collecting document tags further determine the best-match to the highest-ranking subject for which the document tags have not been collected by multiplying all of the tag terms in the entry corresponding to the highest-ranking subject for which the document tags have not been collected by the confidence score of the entry to generate a document subject match score, and compare the computed document subject match scores to determine the best match; and
  storing a representation of the collected set of document tags that identify the electronic documents in a memory of the computer system to provide the response to the request to identify the one or more electronic documents.

14. The computer program product of claim 13, wherein the one or more subjects comprise multiple subjects, and wherein the program instructions for collecting reduce the number of the one or more electronic documents according to values of the subject-determining-power scores for the multiple subjects to refine the response to the request.

15. The computer program product of claim 13, further comprising program instructions for determining a context for the request, wherein the context is information external to the at least one search term, wherein the tags contain context-dependent information, and wherein the program instructions for collecting further match the context with the context-dependent information stored in the tags to obtain the collected set of electronic documents.

16. The computer program product of claim 13, wherein the program instructions for the first matching further select from among multiple context-dependent sets of entries in the one or more of the multiple dictionaries according to a context provided with the request, whereby the applying applies different subject-determining-power scores from the one or more of the multiple dictionaries for the at least one search term according to the context.

17. The computer program product of claim 13, further comprising program instructions for tagging electronic documents within the collection of electronic documents, the tagging comprising program instructions for:
- finding terms within the electronic documents to be tagged;
- matching the terms with the descriptive terms within entries in the multiple dictionaries to determine a ranking of the multiple dictionaries by relative relation of their associated subjects to the content of the electronic documents to be tagged; and
- storing a result of the matching for subsequent retrieval when performing electronic document searches.

* * * * *